Sept. 4, 1956 G. W. SCHATZMAN 2,761,698
FENDER AND FENDER SHIELD ASSEMBLY
Filed July 23, 1952 2 Sheets-Sheet 1
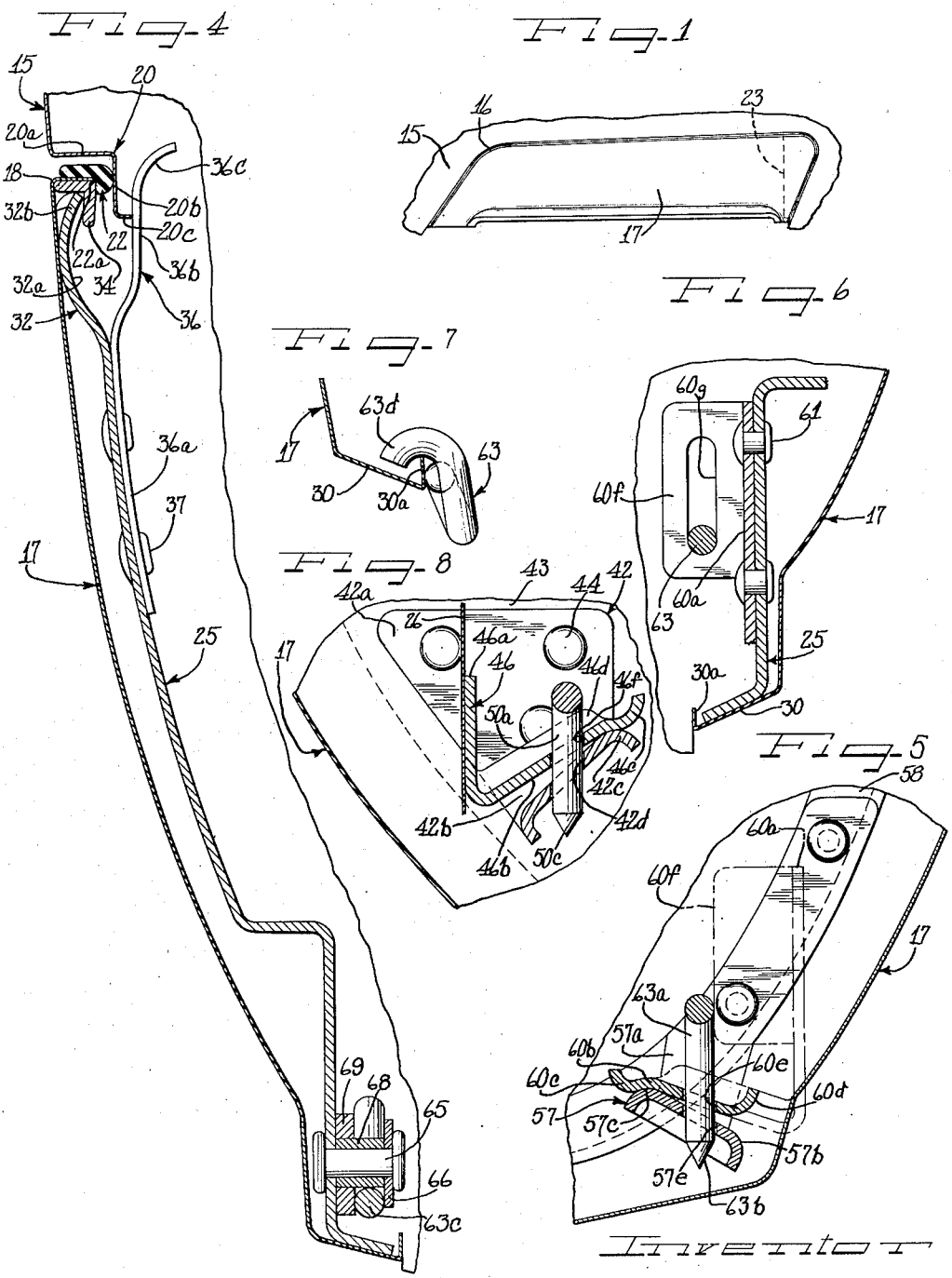
George W. Schatzman

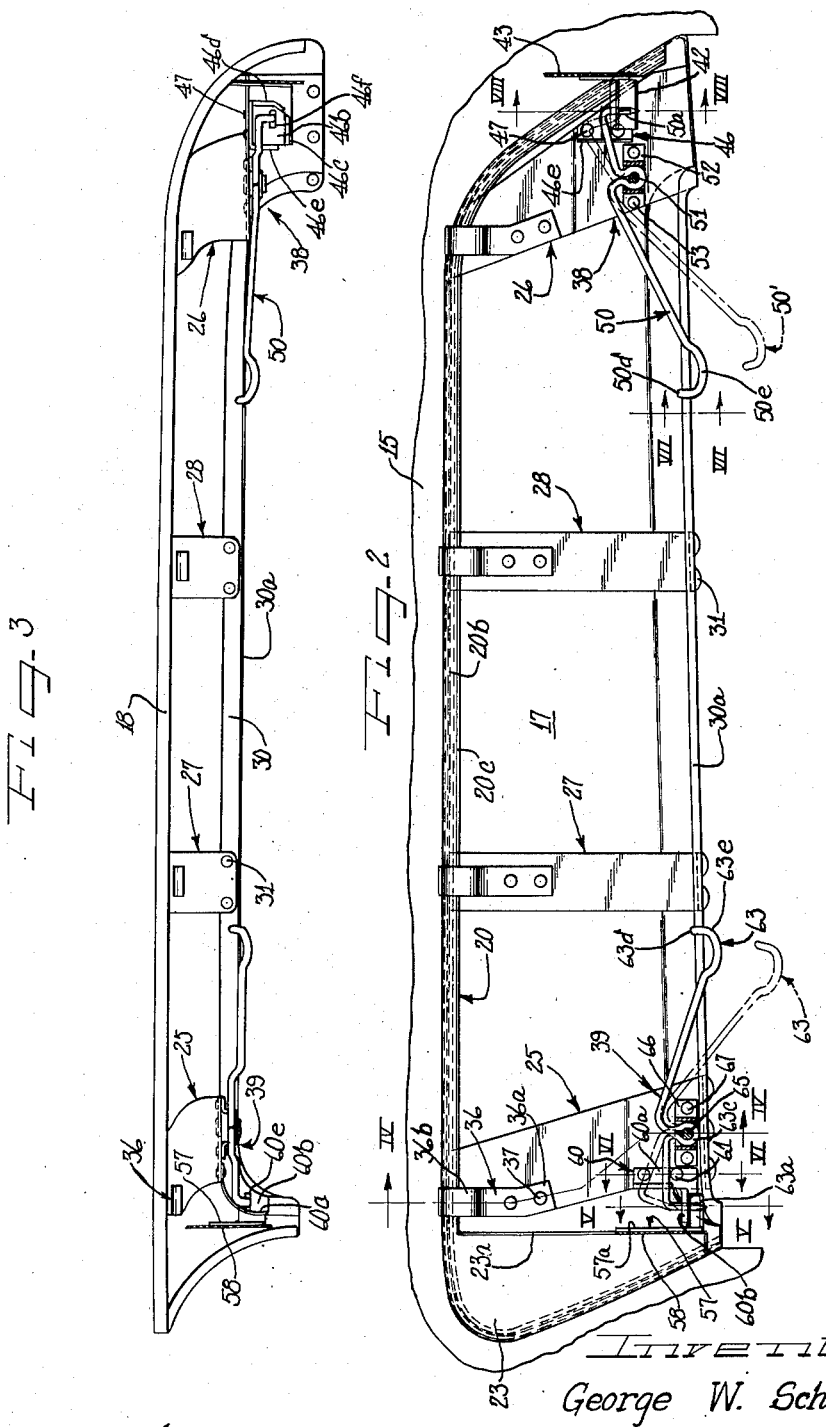

United States Patent Office 2,761,698
Patented Sept. 4, 1956

2,761,698
FENDER AND FENDER SHIELD ASSEMBLY

George W. Schatzman, Detroit, Mich., assignor to Houdaille Industries, Inc., Buffalo, N. Y., a corporation of Michigan Application July 23, 1952, Serial No. 300,400

20 Claims. (Cl. 280—153)

The present invention relates to improvements in fender shields and more particularly concerns the mounting of fender shields in closing relation to the wheel access openings of vehicle fenders.

In the vehicle industry, and particularly in the automobile branch thereof, various means have been utilized to improve the appearance of vehicle fenders. The usual vehicle fender is provided with an opening affording access to the vehicle wheel, and permitting ready removal or replacement of the wheel in an axial direction. Since this opening inherently presents an unattractive outward appearance, and at high speed operation constitutes an air turbulence factor, detachable fender shields have been employed to cover the opening protectively and ornamentally.

As the term "fender shield" shall hereinafter be employed, it refers to any member which is adapted to be secured to a fender or other portion of a vehicle body for the purpose of covering the opening in the fender or vehicle wheel. Furthermore, as the term "fender" shall hereinafter be employed, it refers to any form of wheel fender in its broad sense, whether such fender be separated from the vehicle body, partly separated from the vehicle body, or actually an integral part of the vehicle body and whether or not it projects outwardly from the principal body portion of the vehicle.

An important object of the present invention is to provide a novel fender and fender shield assembly in which the fender shield is secured to the fender in a novel manner.

Another object of the invention is to provide a fender shield having novel means for attaching the same to a fender.

A further object of the invention is to provide a novel structure for detachably securing a fender shield to a fender.

Still another object of the invention is to provide new and improved means for and method of mounting a fender shield.

Other objects, features and advantages of the invention will be readily apparent from the following detailed description of certain preferred embodiments thereof taken in conjunction with the accompanying two sheets of drawings, in which:

Figure 1 is a fragmentary side elevational view of the outer side of a fender and fender shield assembly embodying the features of the present invention;

Figure 2 is an enlarged fragmentary inside elevational view of the fender structure and the fender shield;

Figure 3 is a top plan view of the fender shield of Figure 2;

Figure 4 is an enlarged fragmentary sectional view taken substantially along the line IV—IV of Figure 2;

Figure 5 is a fragmentary sectional view taken substantially along the line V—V of Figure 2;

Figure 6 is a fragmentary enlarged sectional view taken substantially along the line VI—VI of Figure 2;

Figure 7 is an enlarged fragmentary sectional view taken substantially along the line VII—VII of Figure 2; and Figure 8 is a fragmentary enlarged sectional view taken substantially along the line VIII—VIII of Figure 2.

In Figure 1 is shown more or less schematically a fender 15 having a wheel access opening 16 closed by a fender shield 17, the assembly embodying the features of the present invention.

Having reference to Figures 2, 3 and 4, the fender shield comprises a panel made from suitable sheet material such as sheet metal which is dimensioned to fit over the wheel access opening 16 and has a reinforcing inwardly extending flange 18 about its top and end margins, the flange being formed generally right angularly to the plane of the fender shield body. As best seen in Figure 4, this formation of the fender shield flange is adapted to nest within a reinforcing and finishing flange 20 defining the top and rear margins of the fender about the wheel access opening 16, the flange 20 having a portion 20a extending inwardly generally at right angles to the general adjacent plane of the fender, an inner depending marginal portion 20b and an inturned terminal flange 20c.

A resilient anti-rattle and sealing gasket strip 22 is carried by the fender shield flange 18 and in assembly is placed under compression between the fender and the fender shield flanges, the seal 22 being urged into engagement with the depending flange 20b in a manner to be hereinafter described in detail.

As shown in Figure 2, the fender flange 20 merges into an inwardly recessed forward portion 23 which receives the forward portion of the fender shield in overlapping relation thereto. The portion 23 has an inturned flange 23a corresponding to the terminal flange 20c.

The construction and arrangement of the fender and fender shield assembly is of the type wherein the fender shield is mounted by an upward movement within the access opening 16 generally at an angle to the plane of the fender to bring the fender shield and fender flanges 18 and 20, respectively, into general registration. To facilitate such registration and to assure that the outer surface of the fender shield will be flush with the outer surface of the fender, means are provided at the top of the fender shield for engaging with the fender flange. To this end, forward and rear brackets 25 and 26 and intermediate brackets 27 and 28 are fastened to the foot flange 30 of the fender shield as by fastening elements 31. As indicated in Figure 4, these brackets extend upwardly in spaced generally conforming relation to the body of the fender shield 17 and terminate in curved fingers 32 including an outwardly curved portion 32a for abutment against the fender shield body and an inwardly curved terminal portion 32b for engaging in the corner of an angle piece 34 which is secured to the underside of the flange 18.

As seen in Figures 2 and 4, each of the brackets 25—28 has a resilient arm 36 including a base portion 36a secured by fastening means 37 to the bracket and a generally upwardly and inwardly extending portion 36b for engaging behind the fender flange 20 and bearing against the inturned terminal flange 20c thereof. The terminal end portion of the arm 36 is turned inwardly, as indicated at 36c, in order to conveniently engage the fender flange 20 during assembly. It will be appreciated that during the upward movement of the fender shield into engagement with the fender flange 20, the resilient arm 36 will be wedged inwardly by means of the terminal flange 20c so that in final assembled relation, the seal 22 will be snugly urged against the depending flange portion 20b by means of the resilient tension in the resilient arm portion 36b bearing against the terminal flange portion 20c. It will be observed that the angle 34 fits into a recess 22a in the seal 22 to provide a backing for confining a portion of the seal between the angle 34 and the depending flange portion 20b.

The fender shield angle 34, fender shield flange 18 and seal 22 serve to hold the upper part of the fender shield against inward displacement while the resilient arms 36 carried by the fender shield brackets 25—28 serve to retain the upper margin of the fender shield against outward displacement relative to the fender.

At the lower portion of the fender shield are means for supporting the lower portion of the fender shield in assembly with the fender. Herein such means comprises a rear end latching assembly 38 and a front end latching assembly 39.

In mounting the fender shield, the arms 36 are first engaged with the upper margin 20 of the fender, and the fender shield is then swung downwardly and inwardly so as to interengage sloping brackets at the front and rear of the fender and fender shield, respectively. The brackets are so inclined as to wedge the fender shield upwardly into snug engagement with the upper margin 20 of the fender as the fender shield is rocked downwardly and inwardly. The rear interengaging brackets include a bracket 42, Figure 8, carried by an extension plate 43 supported by the vehicle body. The bracket 42 includes a base 42a secured to the plate 43 by fastening means 44 and an inclined camming flange 42b inclined inwardly and upwardly to coact with the bracket 46 carried by the fender shield. The bracket 46 is mounted on the bracket 26 of the fender shield and includes a base portion 46a secured to the bracket 26 of the fender shield by means of fastener elements 47 and an inwardly and upwardly sloping flange 46b having a rounded upturned terminal portion 46c for riding on the flange 42b of the fender bracket 42 and for interlocking engagement with the rounded end portion 42c of the flange 42b in finally assembled relation of the fender shield. The flange 46b is provided with a curved lip 46d at one side edge for increasing the stiffness of the flange 46b. At the opposite edge of the flange 46b is formed an integral plate 46e, Figure 2, which extends at right angles from the base 46a and has an elongated slot similar to that shown in Figure 6 for guiding vertical movement of a spring latching arm 50, Figures 2 and 3.

The spring arm is pivotally mounted by means of a pin 51 and bracket 52 secured to the bracket 26 by means of fastening elements 53. The spring arm is provided with a downturned free end 50a, Figure 8, which is adapted to be driven through aligned slots 46f and 42d of bracket flanges 46b and 42b in their final assembled relation. It will be apparent that if the brackets 42 and 46 are not fully interengaged, the pointed end 50c of the arm 50 will be operative to wedge them into finally assembled position and the free end 50a then functions to retain them in this position. It will be seen that the free end 50a opposes the outwardly directed edge face of slot 46f at the right end of slot 46f, as seen in Figure 8, and opposes the inwardly directed edge face of slot 42d at the left end of slot 42d, as seen in Figure 8.

The forward end latching mechanism 39 operates similarly. In this case the bracket 57, Figure 5, is carried by a plate 58 attached to the vehicle body and includes a base 57a and an inwardly and upwardly inclined flange portion 57b having a rounded upper edge 57c. A bracket 60 of generally L-shape, Figure 2, has a base portion 60a secured to the bracket 25 of the fender shield by means of fastening elements 61 and has a flange portion 60b having a downwardly curved terminal portion 60c for cooperating with the flange 57b and for interlocking with the curved portion 57c of the bracket 57 to interlock the fender shield with the fender in final assembled relation. The bracket 60 is provided with a reinforcing lip 60d at its outer edge for stiffening the flange 60b.

As with the rear latching mechanism, a spring arm 63 is pivotally mounted, as indicated in Figure 4, by means of a pin 65 extending through the bracket 25 and through the bracket 66 secured to the bracket 25 by fastening elements 67, Figure 2. A looped portion 63c of the spring arm 63 engages around a sleeve 68 carried by the pin 65 and the loop is separated from the bracket 25 by means of a washer 69.

As seen in Figure 5, the spring arm 63 has a downturned end 63a having a pointed terminal portion 63b for interlocking the brackets 57 and 60, aligned slots 60e and 57e being provided in the flanges 60b and 57b for this purpose. It will be observed that the free end 63a, when inserted through the aligned slots 60e and 57e, opposes the outwardly directed edge face of slot 60e at the left end of slot 60e, as seen in Figure 5, and opposes the inwardly directed edge face of slot 57e at the right end of slot 57e, as seen in Figure 5. As indicated in Figure 6, the base 60a has an inturned flange 60f with a slot 60g therein for guiding the spring arm 63 into and out of engagement with the flanges 57 and 60.

As indicated in Figure 7, the fender shield foot flange 30 is provided with a marginal upturned lip 30a over which the curved end portion 63d of the spring arm 63 is adapted to hook in final assembled position.

In mounting the fender shield 17, the latch arms 50 and 63 are disposed in released position, as shown in dot dash outlined at 50' and 63' in Figure 2 with the downturned ends 50a and 63a out of engagement with the bracket flanges 46b, 60b, and with the handle ends 50e and 63e free from the fender shield flange lip 30a and extending downwardly, in which position the spring arms are in the upper position in the slots such as 60g shown in Figure 6. The fender shield is then lifted up into the access opening 16 and the arms 36 are engaged behind the fender flanges 20, as shown in Figure 4. In this operation the fender shield is held tilted so that the flanges 46b and 60b of the fender shield do not engage the flanges 42b and 57b carried by the vehicle body. As a second step in the mounting operation, the fender shield is rocked downwardly and inwardly at its lower portion so that the terminal ends 46c and 60c of the fender shield bracket engage the flanges 42b and 57b carried by the vehicle body and upon further inward rocking of the fender shield, ride up the inclined flanges 42b and 57b into interlocking relation therewith, as shown in Figures 5 and 8. Finally, the latching arms 50 and 63 are pivoted to drive the free ends 50a and 63a through the aligned slots 46f, 42d and 60e, 57e, respectively, to interlock the fender shield in assembly with the fender. The terminal ends 63d and 50d are then hooked over the lip 30a of the foot flange 30 of the fender shield to retain the fender shield in assembled position.

For releasing and removing the fender shield assembly 17, the reverse action is effected.

It will be understood that the term "fender" as used in the claims, is intended to comprehend adjacent parts of the vehicle body disposed in fixed relation to the fender proper. This definition is desirable since parts such as the extension plate 43, shown in Figure 2, at the right, are not carried by the fender proper, but by adjacent parts of the vehicle.

It will be understood that modifications and variations may be effected without departing from the scope of the novel concepts of the present invention.

I claim as my invention:

1. In combination in a fender and fender shield assembly, a fender having a wheel access opening and a fender shield for closing said opening, the fender shield having a pair of brackets adjacent the opposite lower ends thereof including portions sloping upwardly and inwardly, cooperating brackets carried by said fender having portions sloping inwardly and upwardly for interengagement with said fender shield bracket sloping portions, and latching arms pivotally mounted on said fender shield and having end portions for interlocking said bracket portions of said fender and said fender shield to restrain said fender shield against outward displacement relative to said fender, said fender bracket portions underlying said fender shield bracket portions to support the lower portion of said fender shield in assembly with said fender, said bracket sloping portions of said fender and said fender shield having openings which are aligned upon full assembly of said fender shield with said fender, and said end portions of said latching arms extending through said aligned openings of said bracket portions to interlock the same and retain said fender shield in assembly with the fender.

2. In combination in a fender and fender shield assembly, a fender having a wheel access opening and a fender shield for closing said opening, the fender shield having fender shield brackets extending from adjacent the lower margin thereof to adjacent the upper margin thereof and secured to said fender shield, spring arms extending from said fender shield brackets adjacent the upper portion of said fender shield for engaging behind said fender, latching brackets carried adjacent the lower portions of said fender shield brackets and having cam faces, cooperating latching brackets carried by the fender having upwardly and inwardly sloping cam faces for interengagment with the cam faces of the fender shield, latching arms pivotally carried by said fender shield brackets, said latching brackets having openings which are aligned upon full assembly of the fender shield with the fender for receiving said latching arms therethrough to interlock the latching brackets to retain the fender shield against outward displacement relative to the fender.

3. In a fender shield assembly, a fender shield having brackets extending from adjacent the lower margin thereof to adjacent the upper margin thereof at each end thereof, resilient arms carried at the upper portions of said brackets and extending in opposed relation to the upper margin of said fender shield for engagement behind a fender margin to prevent outward displacement of the fender shield, a cam member carried adjacent the lower portion of each of said brackets for coaction with a cam surface mounted by the fender to wedge the fender shield upwardly and tension the resilient arms, each cam member being adapted to overlie the cooperating cam surface to support the fender shield in assembled relation, and a latching lever pivotally mounted by said brackets for cooperating with said cam member to interlock said cam member with said cam surface to retain said fender shield in assembled relation.

4. In combination in a fender and fender shield assembly, a fender having a wheel access opening, a fender shield for substantially closing said opening, means on the fender and on the fender shield for retaining the fender shield in assembled relation with said fender, said retaining means comprising flange means carried by said fender, flange means carried by said fender shield overlying said fender flange means in assembled relation of the fender shield, said fender and fender shield flange means having cooperating apertures, and a latching arm pivotally mounted on said fender shield and having a free end with a pointed tip for wedging insertion through the fender shield aperture and into the fender aperture to align the fender bracket aperture with the fender shield bracket aperture.

5. In combination in a fender and fender shield assembly, a fender having a wheel access opening and a fender shield for substantially closing said opening, means for retaining the fender shield in assembled relation with said fender, said retaining means comprising a fender shield bracket at each end of the fender shield and a fender bracket at each side of the wheel access opening, means securing said fender shield brackets with said fender shield, means securing said fender brackets with said fender, said fender and fender shield brackets having cooperating surfaces for wedging the fender shield brackets upwardly as the fender shield is pressed inwardly, and a latching arm mounted at each end of said fender shield and having an end portion engaging the associated fender and fender shield brackets for interconnecting the brackets to retain the fender shield against outward displacement relative to the fender.

6. In combination in a fender and fender shield assembly, a fender having a wheel access opening and a fender shield for substantially closing said opening, means for retaining the fender shield in assembly with said fender, said retaining means comprising flange means carried by said fender, flange means carried by said fender shield, at least one of said flange means having an axially sloping surface for wedging the fender shield upwardly as the fender shield is pressed inwardly into said opening, said fender and fender shield flange means carrying opposed retaining faces directed axially inwardly and axially outwardly respectively, and a latching arm having a wedge-shaped free end for wedging between said opposed retaining faces to press said fender shield axially inwardly and upwardly into completely assembled relation with said fender.

7. In combination in a fender and fender shield assembly, a fender having a wheel access opening, a fender shield for substantially covering said opening, means for retaining said fender shield in assembly with said fender, said retaining means comprising means carried at the upper margin of the fender shield for engaging the fender to accommodate inward pivotal movement of the lower portion of the fender shield about the upper margin of the wheel access opening, flange means carried by said fender at each side of said wheel access opening, flange means carried by said fender shield at each end of said fender shield, said fender and fender shield flange means having cooperating slidably engaging camming surfaces, the fender shield flange surfaces projecting axially inwardly from the fender shield to engage the corresponding fender flange surfaces as the fender shield is pivoted inwardly about the upper margin of the wheel access opening to cam the fender shield upwardly upon further inward movement thereof, and means carried by said fender shield for engaging said fender and fender shield flange means for interconnecting the same, to prevent outward displacement of the fender shield from the fender.

8. In combination in a fender and fender shield assembly, a fender having a wheel access opening and a fender shield for substantially closing said opening, means for retaining said fender shield in assembly with said fender, said retaining means comprising resilient arm means carried by said fender shield adjacent the top margin thereof for resiliently engaging the fender and for accommodating inward pivotal movement of the fender shield about the upper margin of the wheel access opening, cooperating wedging surfaces carried by the fender and by the fender shield at each side of the opening for sliding engagement on inward pivotal movement of the fender shield to wedge the fender shield upwardly into assembled relation to the upper margin of the wheel access opening to tension said resilient arm means in engagement with said fender, and latching means carried by the fender shield for interconnecting said fender and fender shield to retain said arm means in tensioned engagement with said fender.

9. In combination in a fender and fender shield assembly, a fender having a wheel access opening and a fender shield for substantially closing said opening, means for retaining said fender shield in assembly with said fender, said retaining means comprising resilient arm means carried by said fender shield adjacent the top margin thereof for resiliently engaging the fender and for accommodating inward pivotal movement of the fender shield about the upper margin of the wheel access opening, cooperating wedging surfaces carried by the fender and by the fender shield projecting axially outwardly and axially inwardly respectively for sliding engagement on inward pivotal movement of the fender shield to wedge the fender shield upwardly into assembled relation to the upper margin of the wheel access opening to tension said resilient arm means in engagement with said fender, and latching means carried by the fender shield for interconnecting said fender and fender shield to retain said arm means in tensioned engagement with said fender, said resilient arm means comprising means for engaging the outer surface of the fender and an upwardly and inwardly extending resilient arm spaced from said engaging means for progressive wedged engagement with an inwardly directed edge of the fender upon upward movement of the fender shield relative to the fender.

10. In combination in a fender and fender shield assembly, a fender having a wheel access opening and a fender shield for closing said opening, the fender shield having a pair of brackets adjacent the opposite lower ends thereof, cooperating brackets carried by said fender, said brackets having cooperating surfaces for wedging the fender shield upwardly as the fender shield is pressed inwardly at the lower ends thereof, and latching arms pivotally mounted on said fender shield and having end portions for interconnecting said brackets of said fender and said fender shield to restrain the fender shield against outward displacement relative to the fender, said fender bracket surfaces underlying said fender shield bracket surfaces to support the lower portion of the fender shield in assembly with the fender, said brackets of said fender and said fender shield having openings which are aligned upon full assembly of the fender shield with the fender, and said end portions of said latching arms extending through said aligned openings of said brackets to interlock the same and retain said fender shield in assembly with the fender.

11. In combination in a fender and fender shield assembly, a fender having a wheel access opening and a fender shield for closing said opening, means for retaining the fender shield in assembly with the fender, said retaining means comprising upper means carried by the fender shield for engaging the upper margin of the wheel access opening and accommodating hinging movement of the fender shield inwardly about the upper margin of the fender opening, and cooperating lower means carried by said fender and said fender shield at each side of the fender shield below said upper means and projecting axially outwardly and axially inwardly respectively for interengaging upon inward hinging movement of said fender shield about the upper margin of the wheel access opening, said lower means being disposed to force said fender shield upwardly as the fender shield is moved inwardly toward assembled relation to the fender.

12. In a fender and fender shield assembly, a fender having a wheel access opening, a fender shield for substantially closing said opening, means carried at the upper portion of said fender shield for engaging the fender at the upper margin of the wheel access opening to accommodate inward hinging movement of the fender shield about said upper margin of the fender, a bracket carried by the fender and projecting into said wheel access opening, a cooperating bracket carried by said fender shield and projecting inwardly therefrom for engagement with said fender bracket, said fender and fender shield brackets having cooperating camming surfaces arranged for sliding engagement as the fender shield is pivoted about the upper margin of the fender and for wedging the fender shield upwardly into assembled relation with the fender upon further pivoting movement of the fender shield about the upper margin of the fender.

13. In combination in a fender and fender shield assembly, a fender having a wheel access opening and a fender shield for substantially closing said opening, means carried at the upper margin of said fender shield for engaging behind the adjacent portion of the fender at the upper margin of the wheel access opening for accommodating pivotal movement of the fender shield about said upper margin of the fender, said fender having side brackets projecting laterally into said wheel access opening at each side thereof, and said fender shield having cooperating brackets carried thereby and projecting axially inwardly at each end thereof for engagement with said fender brackets as the fender shield is pivoted into said opening about the upper margin of the fender, said fender and fender shield brackets having cooperating surfaces including a sloping surface for wedging said fender shield upwardly as the same is pivoted inwardly to raise the fender shield into fully assembled relation to the fender, and means carried at the lower portion of the fender shield for engaging the fender to retain the fender shield against outward displacement from the fender.

14. For use in a fender and fender shield assembly, a latching mechanism comprising a fender shield bracket to be carried by a fender shield, a cooperating fender bracket to be carried by a fender, said brackets having cooperating surfaces with apertures therethrough for alignment upon assembly of the fender shield with the fender, and a latching arm for pivotal mounting by said fender shield and having a wedge-shaped end for movement into said openings of said fender shield bracket and fender bracket to wedge the fender shield into assembly with the fender and to interconnect the brackets to retain the fender shield against displacement relative to the fender.

15. In a latching mechanism for a fender shield, an actuating lever for pivotal mounting on a fender shield, and having a generally downturned end portion, and a fender shield bracket to be carried by the fender shield and having a planar portion for extending inwardly from the fender shield in generally horizontal disposition and for overlying a portion carried by a fender to support the fender shield, said fender shield bracket inwardly extending portion having an opening therethrough for disposition in the path of movement of said downturned end portion of said actuating lever, said actuating lever downturned end being movable through said opening upon assembly of said fender shield with the fender to interconnect the bracket portion of the fender shield with the portion of the fender therebeneath.

16. In a fender shield assembly, a fender shield having a bracket including a base attachment portion to be carried by a fender shield, and an angularly related inwardly projecting flange extending from said base flange and having an aperture therethrough, the base attachment portion of the bracket being constructed for attachment to the fender shield with the flange extending from the lower margin thereof and generally upwardly and inwardly, and a latching lever for pivotal mounting on the fender shield and having a portion for extension through said bracket aperture and an aperture provided by a fender to interlock the fender shield with the fender.

17. In a fender shield assembly, a fender shield having a bracket including a base attachment portion to be carried by a fender shield, and an angularly related inwardly projecting flange extending from said base flange and having an aperture therethrough, the base attachment portion of the bracket being constructed for attachment to the fender shield with the flange extending from the lower margin thereof and generally upwardly and inwardly, and a latching lever for pivotal mounting on the fender shield and having a portion for extension through said bracket aperture and an aperture provided by a fender to interlock the fender shield with the fender, said flange terminating in a downwardly curved camming portion for riding on a cam surface provided by the fender and for automatic interlocking therewith.

18. In a fender shield assembly, a fender shield having mounting brackets extending from adjacent the lower margin thereof to adjacent the upper margin thereof at each end, latching brackets carried adjacent the lower portion of each of said mounting brackets, and having generally flat attachment portions secured to the respective mounting brackets and having latching flanges extending from the lower margins thereof generally upwardly and inwardly from the fender shield, said latching flanges being adapted to overlie a cooperating flange carried by the fender to support the fender shield in assembled relation, a latching lever pivotally mounted by each of said mounting brackets for cooperating with the adjacent fender shield latching flange to interlock said fender shield latching flange with the cooperating fender flange to retain said fender shield in assembled relation, and means carried at the upper portion of said mounting brackets for cooperating with the fender to retain the upper portion of the fender shield in assembly with the fender.

19. In combination in a fender and fender shield assembly, a fender having a wheel access opening and a fender shield for closing said opening, means for retaining the fender shield in assembly with the fender, said retaining means comprising upper means carried by the fender shield for engaging the upper margin of the wheel access opening and accommodating hinging movement of the fender shield inwardly about the upper margin of the fender opening, and cooperating lower means carried by said fender and said fender shield below said upper means projecting axially inwardly and axially outwardly respectively for interengaging upon inward hinging movement of said fender shield about the upper margin of the wheel access opening, said lower means being disposed to force said fender shield upwardly as the fender shield is moved inwardly toward assembled relation to the fender, and means for automatically interlocking said lower means upon full assembly of said fender shield with said fender.

20. In combination in a fender and fender shield assembly, a fender having a wheel access opening and a fender shield for closing said opening, means for retaining the fender shield in assembly with the fender, said retaining means comprising upper means carried by the fender shield for engaging the upper margin of the wheel access opening and accommodating hinging movement of the fender shield inwardly about the upper margin of the fender opening, and cooperating lower means carried by said fender and said fender shield below said upper means for interengaging upon inward hinging movement of said fender shield about the upper margin of the wheel access opening, said lower means being disposed to force said fender shield upwardly as the fender shield is moved inwardly toward assembled relation to the fender, and means for automatically interlocking said lower means upon full assembly of said fender shield with said fender, said automatically interlocking means including a bracket carried by the fender and a cooperating bracket carried by the fender shield, said fender shield bracket having a downwardly curved portion for engagement with an inwardly directed surface portion on said fender bracket to interlock the brackets.

References Cited in the file of this patent

UNITED STATES PATENTS

| | | |
|---|---|---|
| 1,503,622 | Bachmann | Aug. 5, 1924 |
| 2,062,597 | Moore | Dec. 1, 1936 |
| 2,068,732 | Cadwallader | Jan. 26, 1937 |
| 2,161,160 | Harroun et al. | June 6, 1939 |
| 2,217,838 | Fergueson | Oct. 15, 1940 |
| 2,241,035 | Jandus et al. | May 6, 1941 |
| 2,257,556 | Webb | Sept. 30, 1941 |
| 2,427,160 | Reynolds | Sept. 9, 1947 |
| 2,620,204 | Hammond | Dec. 2, 1952 |
| 2,689,749 | Wise | Sept. 21, 1954 |